US010753327B2

(12) United States Patent
Nishibu et al.

(10) Patent No.: US 10,753,327 B2
(45) Date of Patent: Aug. 25, 2020

(54) FUEL SUPPLY DEVICE

(71) Applicant: AISAN KOGYO KABUSHIKI KAISHA, Obu-shi, Aichi-ken (JP)

(72) Inventors: Hideaki Nishibu, Tokai (JP); Takuhito Fujiwara, Obu (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 82 days.

(21) Appl. No.: 16/091,140

(22) PCT Filed: Mar. 23, 2017

(86) PCT No.: PCT/JP2017/011785
§ 371 (c)(1),
(2) Date: Oct. 4, 2018

(87) PCT Pub. No.: WO2017/175595
PCT Pub. Date: Oct. 12, 2017

(65) Prior Publication Data

US 2019/0128226 A1 May 2, 2019

(30) Foreign Application Priority Data

Apr. 6, 2016 (JP) ................................ 2016-076472

(51) Int. Cl.
*F02M 37/00* (2006.01)
*F02M 37/10* (2006.01)
(Continued)

(52) U.S. Cl.
CPC ........ *F02M 37/0052* (2013.01); *F02M 37/00* (2013.01); *F02M 37/0088* (2013.01);
(Continued)

(58) Field of Classification Search
CPC ............... F02M 37/00; F02M 37/0052; F02M 37/0088; F02M 37/0094; F02M 37/106; F02M 37/18; F02M 37/20
(Continued)

(56) References Cited

U.S. PATENT DOCUMENTS 5,263,458 A * 11/1993 Fujino .................. B60K 15/077 123/514
5,456,235 A * 10/1995 Porter .................. B60K 15/077 123/509
(Continued)

FOREIGN PATENT DOCUMENTS

JP H10122077 A 5/1998
JP 2001050131 A 2/2001
(Continued)

OTHER PUBLICATIONS

Japanese Office Action dated Apr. 26, 2019, for Japanese Application No. 2018-510295 (4 p.)
(Continued)

*Primary Examiner* — Erick R Solis
(74) *Attorney, Agent, or Firm* — Conley Rose, P.C.

(57) ABSTRACT

A fuel supply device includes a sub-tank, a fuel pump, a transfer jet pump, a reduction valve, and a partition wall. The sub-tank is disposed within the fuel tank and forms a container configured to store fuel. The fuel pump is disposed in the sub-tank and is configured to pump fuel from the sub-tank. The transfer jet pump is configured to pump fuel from the fuel tank into the sub-tank. The reduction valve generates heat during operation. The partition wall divides an interior of the sub-tank into a first chamber and a second chamber. The fuel pump is disposed in the first chamber. Fuel passing through the reduction valve is discharged into the second chamber.

19 Claims, 9 Drawing Sheets

(51) Int. Cl.
*F02M 37/20* (2006.01)
*F02M 37/18* (2006.01)

(52) U.S. Cl.
CPC ........ *F02M 37/0094* (2013.01); *F02M 37/10* (2013.01); *F02M 37/106* (2013.01); *F02M 37/18* (2013.01); *F02M 37/20* (2013.01)

(58) Field of Classification Search
USPC .......................................... 123/497, 509, 514
See application file for complete search history.

(56) References Cited

U.S. PATENT DOCUMENTS

| | | | | | |
|---|---|---|---|---|---|
| 5,692,479 | A * | 12/1997 | Ford | F02M 37/0029 123/506 |
| 5,809,975 | A * | 9/1998 | Tuckey | B01D 35/0273 123/509 |
| 5,915,363 | A | 6/1999 | Iwata et al. | |
| 6,039,548 | A * | 3/2000 | Ley | B01D 35/0273 417/313 |
| 7,159,574 | B2 * | 1/2007 | Hayashi | F02M 37/025 123/509 |
| 2005/0045159 | A1 * | 3/2005 | Honda | B60K 15/077 123/509 |

FOREIGN PATENT DOCUMENTS

| | | | |
|---|---|---|---|
| JP | 2001130270 | A | 5/2001 |
| JP | 2008255872 | A | 10/2008 |
| JP | 2009243330 | A | 10/2009 |
| JP | 2012017691 | A | 1/2012 |
| JP | 2014202101 | A | 10/2014 |
| JP | 2015214270 | A | 12/2015 |

OTHER PUBLICATIONS

English Translation of Japanese Office Action dated Apr. 26, 2019, for Japanese Application No. 2018-510295 (4 p.).
PCT/JP2017/011785 International Search Report and Written Opinion dated May 16, 2017 (9 p.).

* cited by examiner

FUEL SUPPLY DEVICE

CROSS-REFERENCE TO RELATED APPLICATIONS

The present application is a 35 U.S.C. § 371 National Phase entry of, and claims priority to, PCT Application No. PCT/JP2017/011785 filed Mar. 23, 2017, which in turn claims priority to Japanese Patent Application No. 2016-076472 filed Apr. 6, 2016, both of which are incorporated herein by reference in their entireties for all purposes.

STATEMENT REGARDING FEDERALLY SPONSORED RESEARCH OR DEVELOPMENT

Not applicable.

BACKGROUND

The present disclosure relates to a fuel supply device for supplying fuel to an engine.

A fuel pump in a fuel tank is connected to an associated engine via a fuel line. The fuel pump supplies fuel from within the fuel tank to the engine, and the engine consumes the fuel. A return passage branches off from the fuel line and a reduction valve is provided in the return passage. When the amount of fuel consumed by the engine is small, the reduction valve opens to return a part of the fuel fed from the fuel pump through the return passage back into the fuel tank.

A fuel pump disclosed in Japanese Laid-Open patent publication No. 2008-255872 is provided within a sub-tank disposed within a fuel tank. Due to this arrangement, fuel remains in the sub-tank even when fuel in the fuel tank is unevenly distributed. Consequently, the fuel pump can supply fuel from the fuel tank to the engine without being affected by the unevenly distributed fuel. In this arrangement, both the fuel pump and the reduction valve are disposed within the sub-tank.

The reduction valve generates heat as it operates. The generated heat of the reduction valve may in turn generate fuel vapors (hereinafter, referred to as vapor) around the reduction valve. As a result, the vapor may be mixed into fuel before it is sucked into the fuel pump. When the liquid fuel with mixed vapor is sucked in the fuel pump, the amount of fuel discharged from the fuel pump may be reduced by the amount of the mixed vapor. As a result of the heat and associated vapors generated by operation of the reduction valve, the fuel pump may not be able to supply the necessary amount of fuel for and to the engine.

Conventionally, a structure capable of preventing the generation of vapors near a functional component from being sucked into the fuel pump has been desired for a fuel supply device, wherein the fuel device includes a fuel pump arranged in a sub-tank within a fuel tank and the functional component arranged around the fuel pump, wherein the functional component generates heat when it operates, similar to the reduction valve.

BRIEF SUMMARY

According to one aspect of the present disclosure, a fuel supply device includes a sub-tank, a fuel pump, a pumping apparatus, a functional component, and a partition wall. The sub-tank is provided within the fuel tank and constitutes a container capable of reserving the fuel. The fuel pump is provide within the sub-tank, and serves to pump fuel from within the sub-tank. The functional component generates heat while it is operated. The partition wall partitions is positioned in the sub-tank and divides the interior of the sub-tank into first and second chambers. The fuel pump is disposed in the first chamber. Fuel passing through the functional component is discharged into the second chamber and/or passes through the second chamber.

The pumping apparatus includes, for example, an electric pump and a jet pump (ejector pump), etc. The functional component may include, for example, a reduction valve and a controller for driving a fuel pump with a power transistor, etc. The reduction valve may further include, for example, a solenoid arranged in a return passage of the fuel pump.

Vapor may be generated in fuel when the fuel is heated by heat generated by the functional component. The fuel flowing through the functional component is discharged into or passes through a second chamber. Fuel within the second chamber may overflow from the second chamber, for example, by the pumping apparatus. Therefore, the vapor generated by heat from the functional component tends to be generated in the second chamber but not the first chamber in which the fuel pump is disposed. As a result, there is a reduced potential for the vapor generated by heat from the functional component to mix with fuel sucked into the fuel pump.

According to another aspect of the present disclosure, the functional component may be positioned above a partition wall. The partition wall may include a first portion positioned below the functional component and a second portion positioned higher than the first portion but low enough so that the functional component is not arranged above the second wall.

Therefore, when fuel is pumped up into the second chamber by the fuel pump and the fuel overflows from the second chamber, the fuel leaks into the second chamber through the lower first portion. Consequently, the fuel flows while being in contact with the functional component that is positioned above the first portion, and is therefore able to cool the functional component.

According to another aspect of the present disclosure, the functional component may be arranged above the first and second chambers. Therefore, the fuel flowing over the partition wall from the second chamber into the first chamber may flow along the functional component in the flow path from the second chamber to the first chamber so as to cool the functional component.

According to another aspect of the present disclosure, the partition wall may have two laterally adjacent portions, wherein the height of the second portion measured vertically from a bottom of the sub-tank is higher than the height of the first portion measured vertically from the bottom of the sub-tank. Therefore, when the fuel is pumped by the pumping apparatus into the second chamber and subsequently overflows from the second chamber into the first chamber, the fuel does not easily leak over the second portion but leaks over the first portion. In addition, the height of the second portion measured vertically from a bottom of the sub-tank is higher than a lowest height of the functional component measured vertically from the bottom of the sub-tank, and the functional component extends over the first portion. Consequently, the fuel overflowing over the first portion passes around the functional component. Thus, in this manner the fuel flowing over the first portion and around the functional component may cool the functional component.

According to another aspect of the present disclosure, the functional component may be provided in a return passage configured to return a part of fuel discharged out of the fuel pump back to the fuel tank. The functional component may be a reduction valve including a solenoid configured to open or close the return passage by energizing or de-energizing. The flow of fuel passing through said passage may cool the reduction valve disposed near the fuel pump or prevent vapor, which may be otherwise be generated by heat generated at the reduction valve, from being generated.

DETAILED DESCRIPTION

Figure 1:
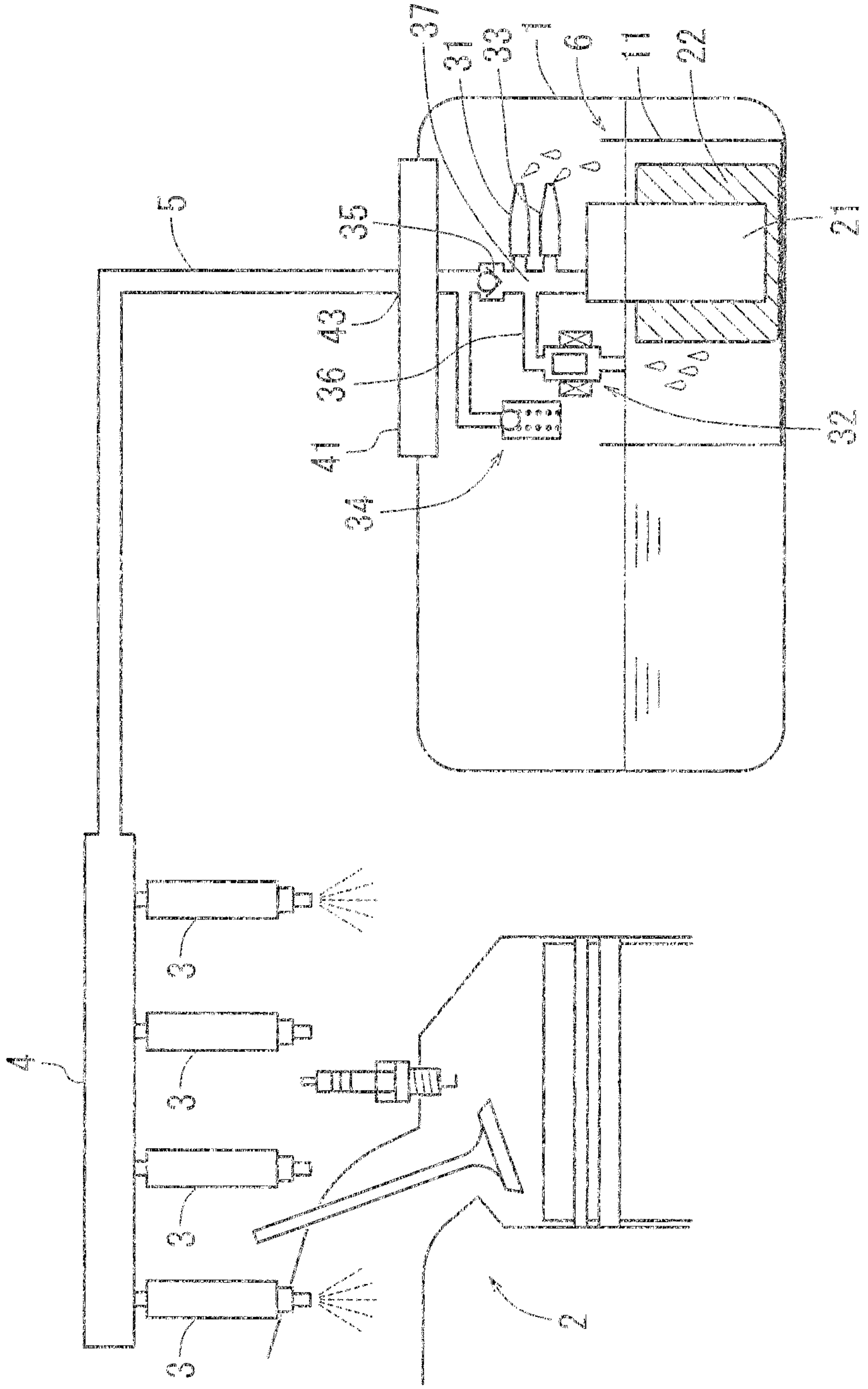
FIG. 1 is a schematic view of an embodiment of a fuel supply system in accordance with the principles described herein.

As shown in FIG. 1, a fuel supply device 6 includes a sub-tank 11 disposed within a fuel tank 1. A fuel pump 21 is disposed within the sub-tank 11. In general, the sub-tank 11 is a container fully enclosed within the fuel tank 1 and capable of storing a portion of the fuel within the fuel tank 1. The fuel pump 21 serves to pump up fuel from within the sub-tank 11 to a fuel injection valve 3 of an associated engine 2.

Figure 2:
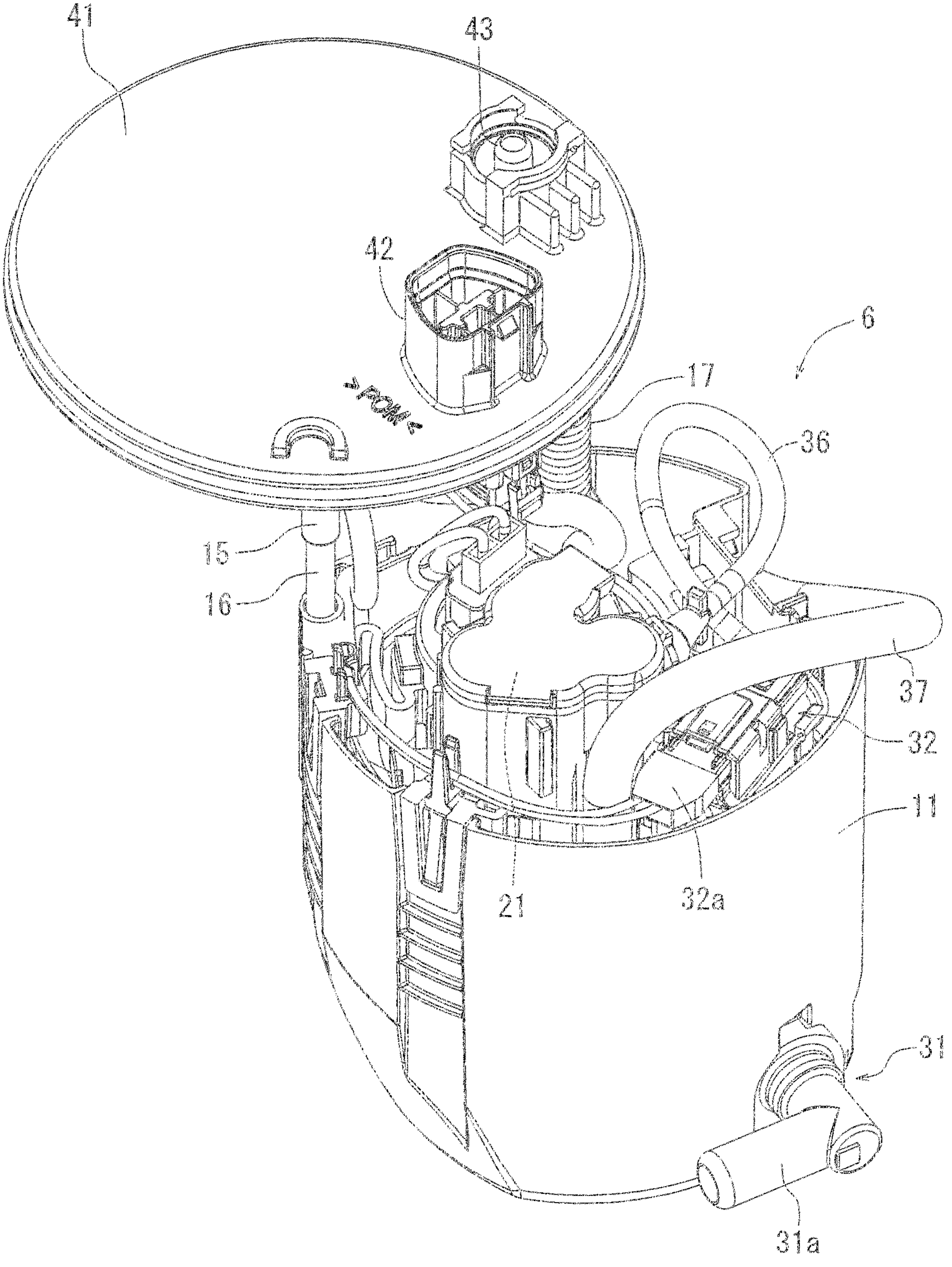
FIG. 2 is a perspective view of the fuel supply device of FIG. 1.
Figure 9:
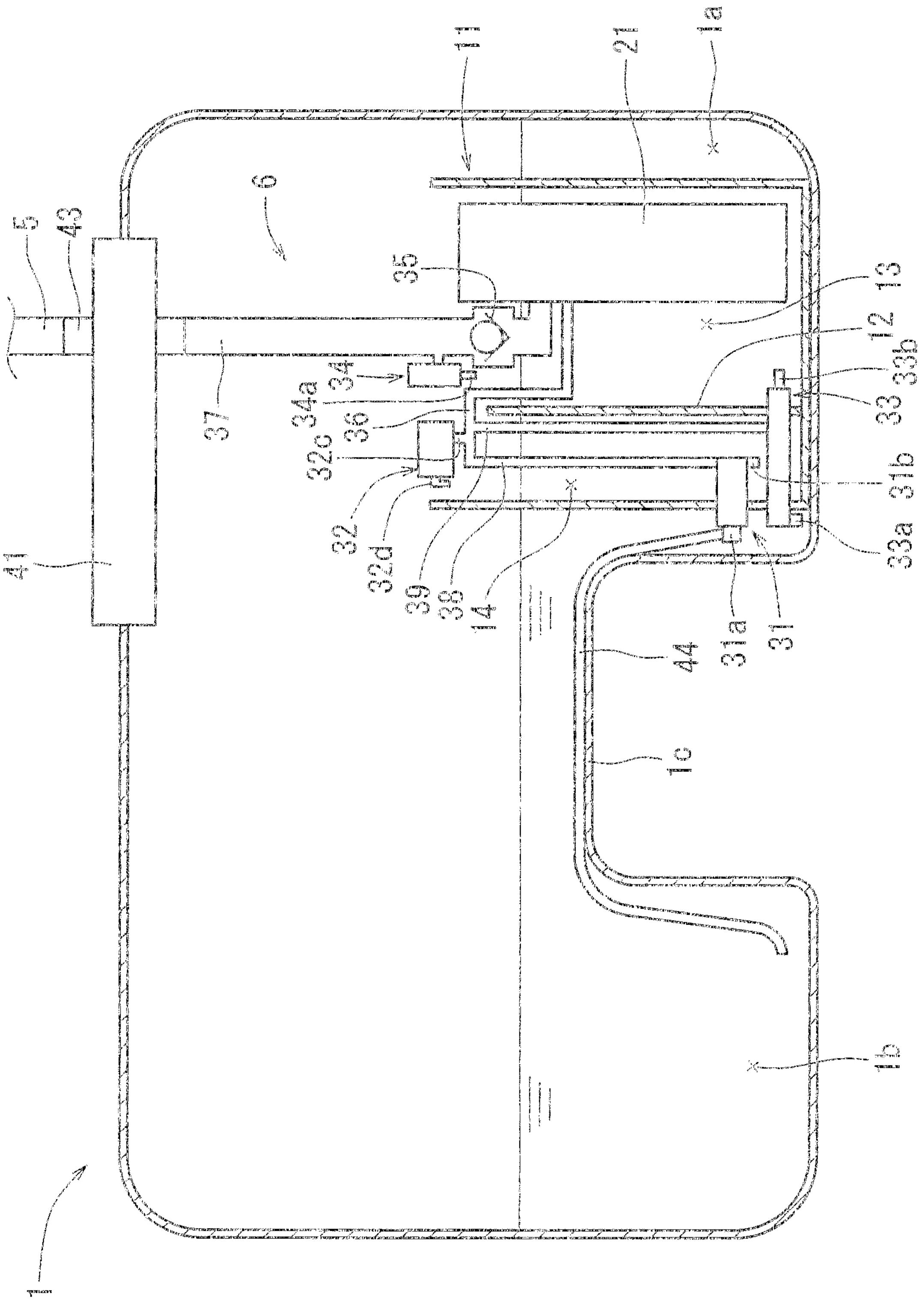
FIG. 9 is a schematic view of the fuel tank and the fuel supply device of FIG. 1.

As shown in FIGS. 1 and 9, the fuel pump 21 sucks fuel from within the sub-tank 11 and applies pressure to the fuel to discharge the fuel. A portion of the fuel discharged from the fuel pump 21 is discharged into the return passage 36. The return passage 36 is, for example, a pipe as shown in FIG. 2. As shown in FIG. 9, the return passage 36 is connected to a transfer jet pump 31 via a liquid passage 38, and is also connected to a pumping jet pump 33 via a liquid passage 39. The transfer jet pump 31 and the pumping jet pump 33 are both so-called ejector pumps (pumping apparatus). The transfer jet pump 31 and the pumping jet pump 33 both utilize the flow energy of the fuel to be supplied.

Figure 6:
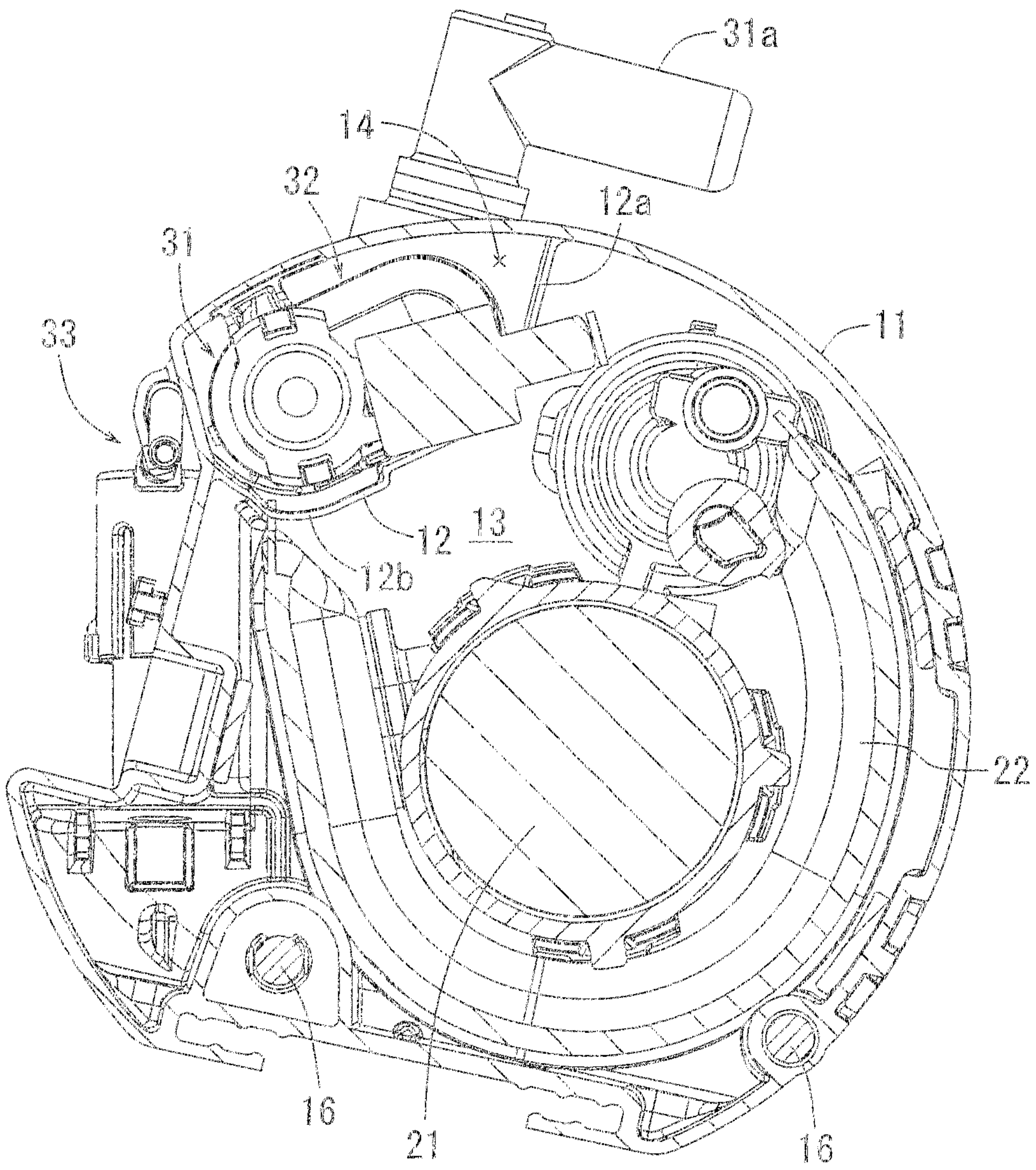
FIG. 6 is a cross-sectional view of the fuel supply device of FIG. 1 taken along a line VI-VI in FIG. 3.

As shown in FIGS. 6 and 9, the transfer jet pump 31 is provide in the sub-tank 11 and includes a suction port 31*a* (see FIG. 2) and a discharge port 31*b*. The suction port 31*a* is positioned outside of the sub-tank 11 and is connected with a fuel transfer pipe 44. The fuel transfer pipe 44 extends from a first region 1*a* over a raised portion 1*c* to a second region 1*b* of the saddle-type fuel tank 1. The upwardly extending or raised portion 1*c* is positioned between the first region 1*a* and the second region 1*b*.

As shown in FIG. 9, the discharge port 31*b* of the transfer jet pump 31 is positioned within the sub-tank 11. More specifically, the discharge port 31*b* is positioned in a downward orientation within a second chamber 14 of the sub-tank 11 defined by a partition wall 12. The second chamber 14 is positioned to the left of the wall 12 in FIG. 9, and a first chamber 13 is positioned to the right of the wall 12 in FIG. 9. The transfer jet pump 31 sucks fuel from the second region 1*b* of the fuel tank 1, to the left of portion 1*c*, utilizing the flow energy of the fuel itself, and discharges the fuel into the second chamber 14 of the sub-tank 11 when fuel is supplied from the fuel pump 21.

As shown in FIG. 9, the pumping jet pump 33 is provided in the sub-tank 11 and includes a suction port 33*a* (see FIG. 3) and a discharge port 33*b*. The suction port 33*a* is positioned in the vicinity of the sub-tank 11, to its immediate left, in FIG. 9 and is oriented downward. The discharge port 33*b* is positioned in the first chamber 13 of the sub-tank 11. The pumping jet pump 33 sucks fuel from the first region 1*a* of the fuel tank 1, to the right of portion 1*c*, in the vicinity of the sub-tank 11. The pumping jet pump 33, when sucking the fuel, utilizes the flow energy of the fuel, and discharges the fuel into the first chamber 13 of the sub-tank 11 when fuel is supplied from the fuel pump 21.

As shown in FIG. 9, a connection pipe 37 is connected to an outlet port of the fuel pump 21. The connection pipe 37 is connected to an outlet pipe 43 provided as part of the cover member 41 shown in FIG. 4. As shown in FIGS. 1 and 9, the outlet pipe 43 is in turn connected to the fuel line 5. Therefore, the fuel discharged from the fuel pump 21 is supplied to the fuel line 5 through the outlet pipe 43, and onward to a fuel distribution pipe 4 through the fuel line 5. The fuel distribution pipe 4 is connected to a plurality of fuel injection valves 3, serving as terminal outputs. The fuel distribution pipe 4 serves to distribute fuel adjusted at a constant pressure to each of the fuel injection valves 3. For example, four fuel injection valves 3 may be connected to the fuel distribution pipe 4.

The fuel distribution pipe 4 is provided with a fuel pressure sensor (not shown) that is configured to detect pressure within the fuel distribution pipe 4. The measurement outputs of the fuel pressure sensor are transmitted to a control circuit such as an ECU (electric control unit). This control circuit serves to control opening/closing of the reduction valve 32 while adjusting the output of the fuel pump 21 so that the fuel pressure within the fuel distribution pipe 4 will be maintained at a set pressure in accordance with the detected output of the fuel pressure sensor. When the fuel pressure within the fuel distribution pipe 4 becomes higher than the set pressure, the reduction valve 32 is energized to open to reduce the pressure within the fuel distribution pipe 4.

As shown in FIGS. 1 and 9, the reduction valve 32 is connected to the return passage 36. The reduction valve 32, placed within the sub-tank 11, is positioned close to the fuel pump 21. The reduction valve (functional component) 32 is an electromagnetic valve and generates heat when energized. The reduction valve 32 includes a discharge port 32*d*. The discharge port 32*d* is oriented downwardly toward the second chamber 14 of the sub-tank 11. Fuel passing through the reduction valve 32 is warmed up by the reduction valve 32 and then discharged into the second chamber 14 of the sub-tank 11.

As a result, the fuel vapor (also referred to herein as "vapor") formed by the heat generated by the normal operation of the reduction valve 32 is directed into the second chamber 14, and thus, is restricted and/or prevented from going into the first chamber 13. As a result, the amount of fuel including vapor sucked by the fuel pump 21 from within the first chamber 13 is minimized. Fuel passing through the reduction valve 32 flows through the liquid passages 38 and 39, which are also present in the second chamber 14. Consequently, any residual vapor generated around the outer periphery of the liquid passages 38 and 39 is also generated in the second chamber 14, and is also restricted and/or prevented from going to the first chamber 13.

As shown in FIGS. 1 and 9, a check valve 35 is disposed along the outlet port of the fuel pump 21. The check valve 35 is positioned upstream of the fuel line 5, the outlet pipe 43, and the connection pipe 37. The check valve 35 opens when discharged fuel pressure from the fuel pump 21 crosses a predetermined threshold pressure value with respect to pressure in the fuel line 5. As a result, at or above the threshold pressure value, the fuel is supplied to the engine 2 from the fuel pump 21 via the fuel line 5.

Conversely, the check valve 35 closes when the discharged fuel pressure from the fuel pump 21 is lower than said the threshold pressure value with respect to the pressure in the fuel line 5. As a result, when the discharged fuel pressure is lower than the threshold pressure value, the fuel is prevented by the check valve 35 from flowing freely from the fuel pump 21 to the fuel line 5. In this manner, the check valve 35 allows the fuel to be supplied from the fuel pump 21 to the fuel line 5 in a normal mode operation of the fuel pump 21 when desired pressure requirements are met. The check valve 35 also prevents pressurized fuel in the fuel line 5 from flowing back toward the fuel pump 21 when the operation of the fuel pump 21 is stopped.

As shown in FIGS. 1 and 9, a relief valve 34 is connected downstream of the outlet port of the fuel pump 21 and the check valve 35. In particular, the relief valve 34 branches off from the connection pipe 37 slightly spaced apart from and adjacent to the downstream end of the check valve 35. The relief valve 34 is positioned upstream of the fuel line 5 and the downstream end of connection pipe 37. The relief valve 34 is disposed within the sub-tank 11 and includes a discharge port 34*a* which opens downward toward the first chamber 13 of the sub-tank 11. As described, the relief valve 34 opens when fuel pressure supplied to the fuel line 5 crosses a pre-determined threshold pressure value (abnormal value). When this occurs and the fuel pressure supplied to the fuel line 5 crosses the threshold pressure value, the relief valve 34 opens and returns fuel discharged from the fuel pump 21 into the first chamber 13 of the sub-tank 11.

Figure 7:
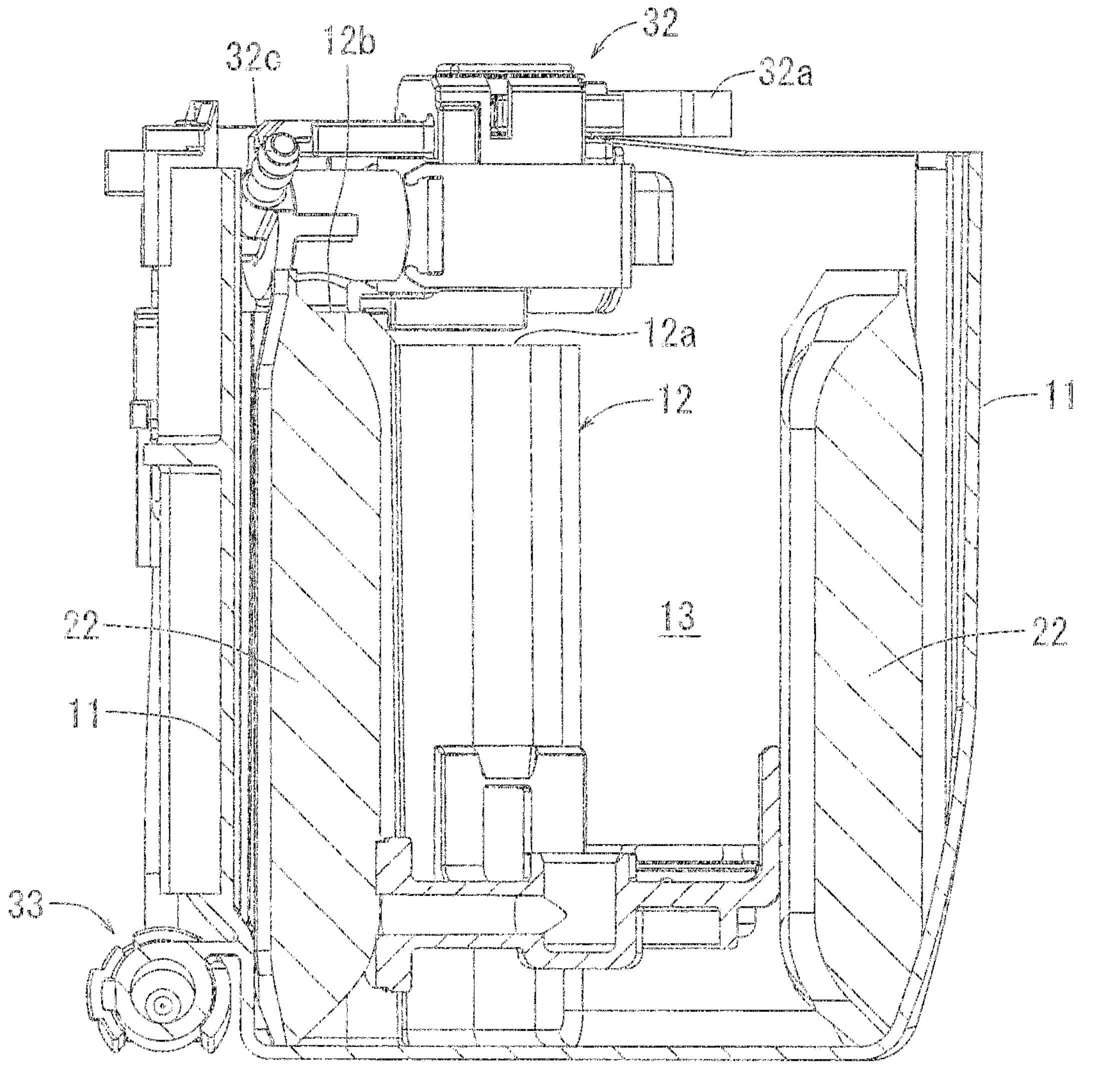
FIG. 7 is a cross-sectional view of the fuel supply device of FIG. 1 taken along a line VII-VII in FIG. 5 and excluding additional components.

As shown in FIGS. 1 and 7, the fuel filter 22 is disposed within the sub-tank 11. The fuel filter 22 surrounds the fuel pump 21. The fuel within the sub-tank 11 passes through the fuel filter 22 and is drawn into the fuel pump 21.

Figure 3:
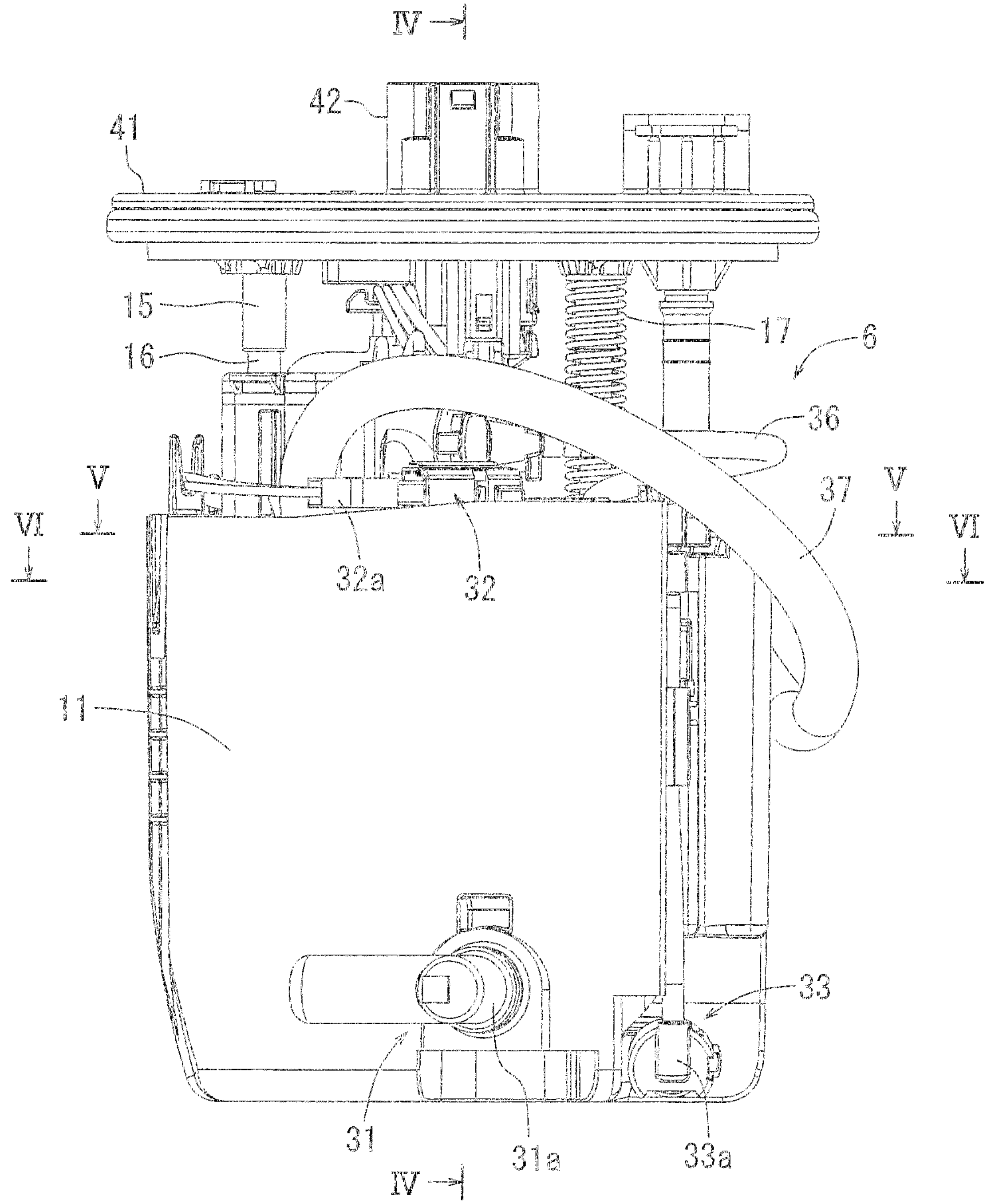
FIG. 3 is a front view of the fuel supply device of FIG. 1.
Figure 4:
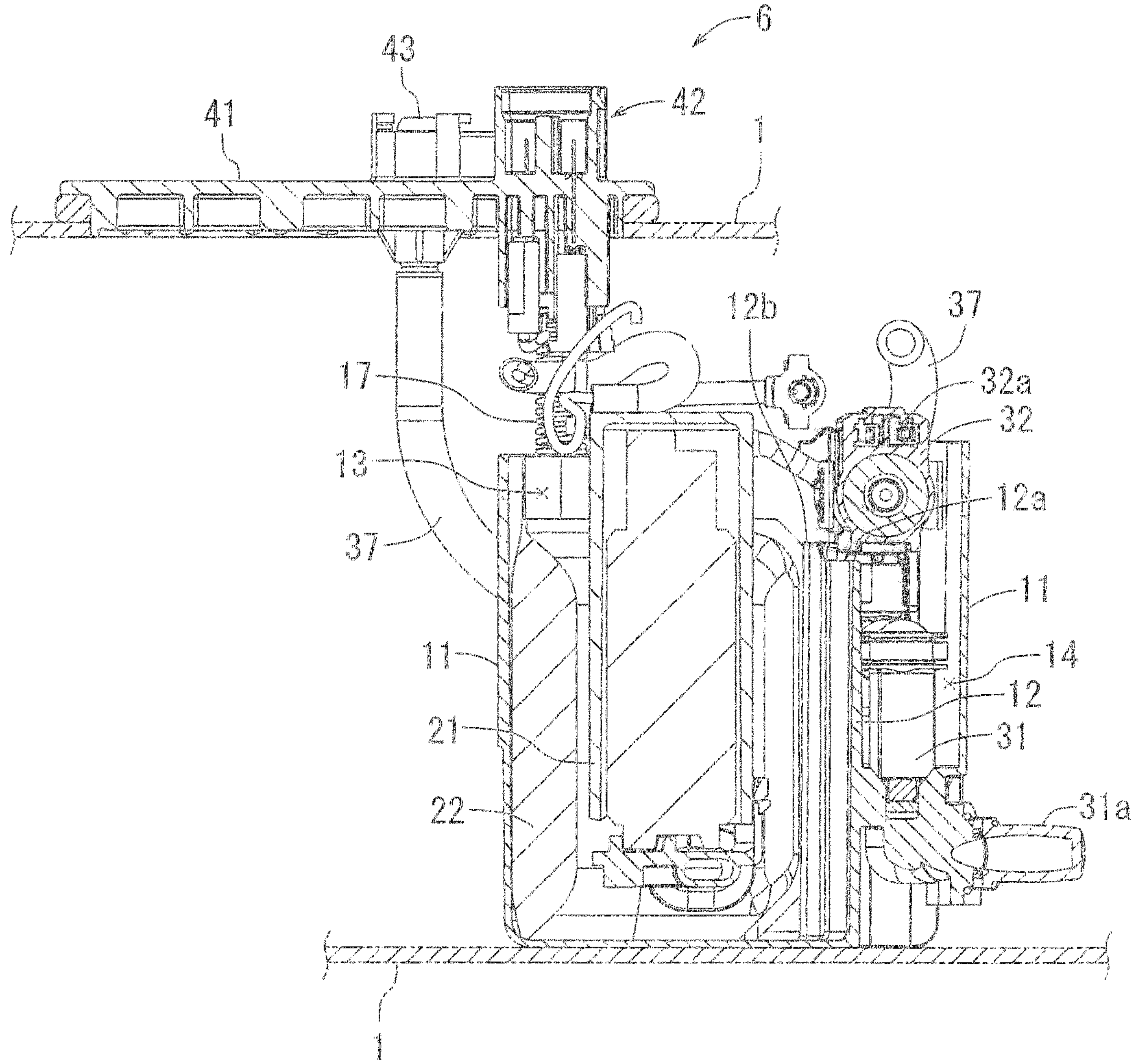
FIG. 4 is a cross-sectional view of the fuel supply device of FIG. 1 taken along a line IV-IV in FIG. 3.

As shown in FIGS. 2 to 4, the fuel supply device 6 includes a cover member 41. The cover member 41 is connected to the sub-tank 11 by support columns 16. The support columns 16 extend downwardly from support column holders 15 of the cover member 41 and are slidably inserted into a part of the sub-tank 11. A spring 17 is fitted around the outer circumferential periphery of one of two support columns 16. The spring 17 biases the cover member 41 and the sub-tank 11 apart in vertically opposite directions. Therefore, the sub-tank 11 is coupled to the cover member 41 by the support column 16 and the spring 17, with the cover member 41 being capable of contacting and being separatable from the cover member 41.

As shown in FIG. 4, the cover member 41 covers an opening of the fuel tank 1. This opening of the fuel tank 1, located on the upper part of the fuel tank 1, is circular, and allows the fuel supply device 6 and sub-tank 11 to be inserted into the fuel tank 1. When the fuel supply device 6, and the accompanying sub-tank 11, are inserted into the fuel tank 1 and the cover member 41 of the device 6 is attached to the opening of the fuel tank 1, a bottom of the sub-tank 11 is pressed flush against and firmly abuts the bottom of the fuel tank 1 due to the biasing force of the spring 17, which pushes downward on the sub-tank 11 when the fuel supply device 6 is upright. As shown in FIGS. 2 to 4, the cover member 41 is provided with an electrical connector 42 configured to be connected with electrical wiring that serves to connect the fuel supply device 6 with the control circuit (not shown).

As explained above, the sub-tank 11 is divided into two chambers, the first chamber 13 and the second chamber 14, by the partition wall 12. The fuel pump 21 and the fuel filter 22 are disposed in the first chamber 13. The transfer jet pump 31 and the pumping jet pump 33 are disposed in the second chamber 14. Accordingly, the second chamber 14 is sized such that it may accommodate the transfer jet pump 31 and the pumping jet pump 33, where the volume of the second chamber 14 is smaller than that of the first chamber 13. The partition wall 12 is lower than the lateral walls of the sub-tank 11 as measured vertically from the bottom of the sub-tank 11.

The transfer jet pump 31 pumps up fuel from within the second region 1*b* of the fuel tank 1, to the left of the portion 1*c*, through fuel transfer pipe 44, to inject the fuel toward a bottom of the second chamber 14. When this fuel fills up the second chamber 14, it flows over the partition wall 12 into the first chamber 13. At the time this overflow is occurring, fuel injected from the transfer jet pump 31 bounces back at the bottom of the second chamber 14 and overflows so as to spout out above the second chamber 14.

When the transfer jet pump 31 stops operating, the fuel within the sub-tank 11 may flow out of the sub-tank 11 through the transfer jet pump 31. However, because the partition wall 12 is provided, only fuel in the second chamber 14 of the sub-tank 11 may flow out of the sub-tank 11. Therefore, fuel in the first chamber 13 of the sub-tank 11 is prevented from flowing out of the sub-tank 11 through the transfer jet pump 31. As a result, it is possible to maintain a substantial amount of fuel capable of being pumped up around the fuel pump 21.

Figure 5:
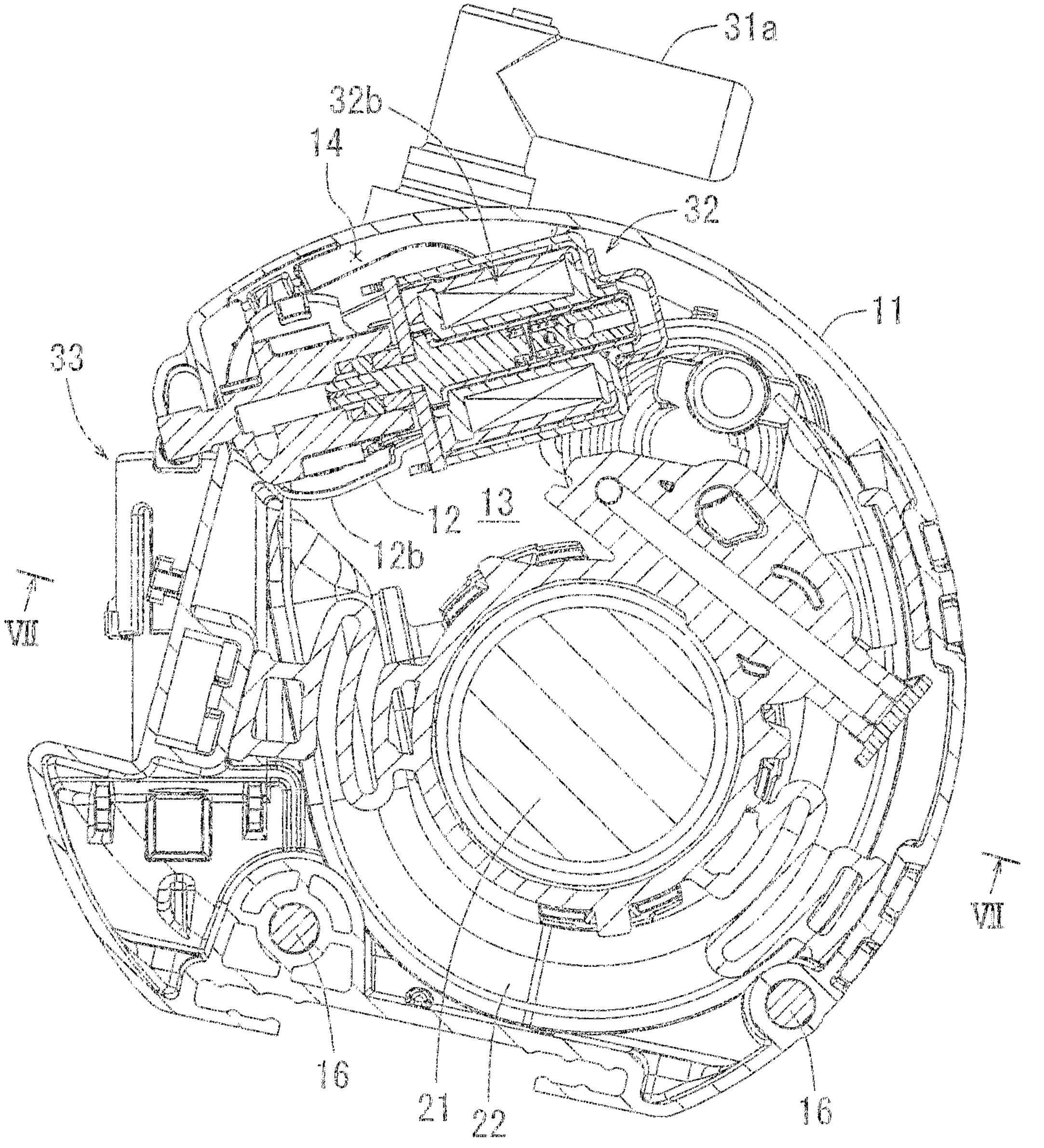
FIG. 5 is a cross-sectional view of the fuel supply device of FIG. 1 taken along a line V-V in FIG. 3.

As shown in FIG. 4, the reduction valve 32 is fixed above the transfer jet pump 31. As shown in FIG. 5, the reduction valve 32 includes a solenoid 32*b* which is magnetized upon being energized. The reduction valve 32 as a whole is positioned above the partition wall 12, as seen in FIG. 4, and is positioned vertically above the first chamber 13 and the second chamber 14. As shown in FIG. 2, to power the reduction valve 32, an electric connector 32*a* is provided on the upper portion of the reduction valve 32. The connector 32*a* is electrically connected via a plug with wires extending from the connector 32 to the electrical connector 42 provided on the cover member 41. All parts of the reduction valve 32 excluding the connector 32*a* are installed at a position vertically below the upper end of the sub-tank 11. In contrast, the connector 32*a* is installed at a position above the upper end of the sub-tank 11.

Figure 8:
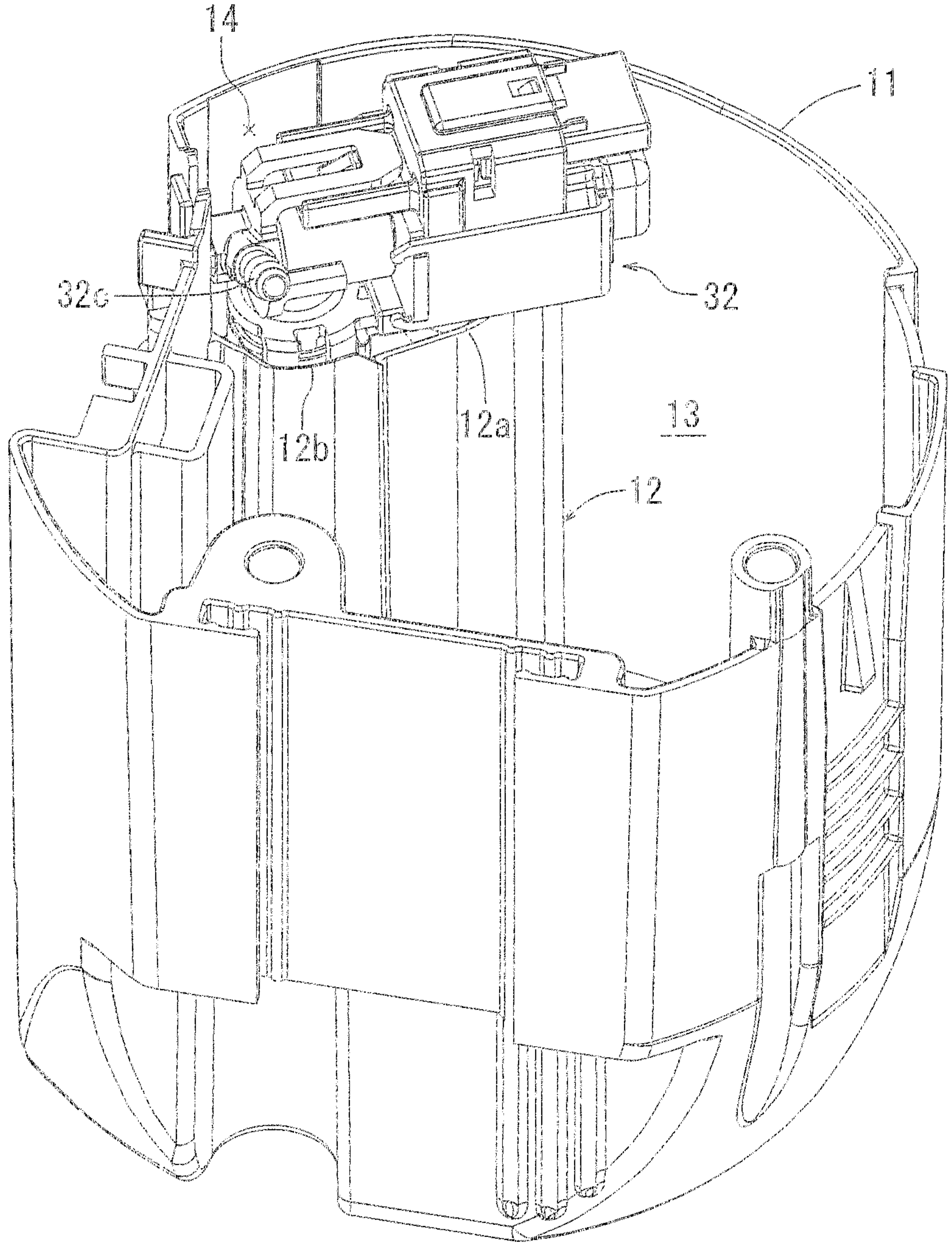
FIG. 8 is a perspective view of the fuel supply device of FIG. 1 excluding the additional components.

As shown in FIGS. 4, 7 and 8, the partition wall 12 includes a first portion 12*a* and a second portion 12*b* extending laterally from the first portions 12*a*. As seen in FIG. 8, the reduction valve 32 is positioned such that it extends physically over the first portion 12*a* of the partition wall 12 but not over the second portion 12*b*. As seen in FIG. 7, the second portion 12*b* extends to a greater height than the first portion 12*a* as measured vertically from the bottom. In FIG. 7, the fuel pump 21 is omitted for the sake of better visibility of the partition wall 12. In FIG. 8, the fuel pump 21 and the fuel filter 22 are omitted.

When fuel flows from the second chamber 14 into the first chamber 13, the majority of the fuel passes over the first portion 12*a*. The amount of the fuel passing over the second portion 12*b* is relatively small. Since the reduction valve 32 extends over the first portion 12*a*, the fuel flowing in this manner from the second chamber 14 into the first chamber 13 passes around the reduction valve 32 such that the reduction valve 32 is cooled by the flowing fuel, thereby reducing and/or preventing the formation of vapor. When the sub-tank 11 is filled with the fuel, the reduction valve 32 may be immersed in the fuel and cooled by the fuel.

According to the above exemplary embodiment, the transfer jet pump 31 is a pumping apparatus. The pumping jet pump 33 may also be a pumping apparatus. Alternative to the jet pump, an electric pump may be adopted.

According to the above exemplary embodiment, the reduction valve 32 is a functional component positioned above the partition wall 12 and extending over the first chamber 13. Alternatively, the reduction valve 32 may be positioned above the second chamber 14 at the side of the partition wall 12. Even in such an alternative embodiment, if the lowest height of the partition wall 12 of the sub-tank 11 is higher than the lowest height of the functional component as measured from the bottom of the sub-tank 11, the functional component (e.g., the reduction valve 32) can be cooled by the fuel overflowing from the second chamber 14 into the first chamber 13. In addition, due to such cooling, vapor generated around the reduction valve 32 may be reduced and/or prevented from.

According to the above exemplary embodiment, the fuel supply device 6 includes the reduction valve 32 as a functional component. The fuel supply device 6 may also include a control circuit for controlling operation of the fuel pump 21 and the reduction valve 32 in combination as a functional component. The control circuit may also generate heat during operation.

According to the exemplary embodiment, fuel passing near the reduction valve 32 is supplied to the transfer jet pump 31 and the pumping jet pump 33. Alternatively, fuel passed through the reduction valve 32 may be supplied to the transfer jet pump 31 and the pumping jet pump 33.

Fuel discharged out of the reduction valve 32 is discharged back into the second chamber 14. Overt time, the fuel in the second chamber 14 overflows from the second chamber 14 to the first chamber 13 together with fuel pumped up by the transfer jet pump 31. At this time, the fuel flows over the partition wall 12. Therefore, a flow passage of the fuel is elongated such that the possibility where the vapor in the fuel is discharged out into the air will increase. As a result, the amount of vapor contained in the fuel to be sucked into the fuel pump 21 may be reduced.

According to the above exemplary embodiment, a functional component (e.g., the reduction valve 32) is arranged on the upper portion of or above the second chamber 14. Alternatively, the functional component may be arranged in a middle or on a lower portion of the second chamber 14.

The various examples described above in detail with reference to the attached drawings are intended to be representative of the present invention and are thus non limiting embodiments. The detailed description is intended to teach a person of skill in the art to make, use and/or practice various aspects of the present teachings and thus does not limit the scope of the invention in any manner. Furthermore, each of the additional features and teachings disclosed above may be applied and/or used separately or with other features and teachings in any combination thereof, to provide improved fuel supply device and/or methods of making and using the same.

The invention claimed is:

1. A fuel supply device comprising:

a sub-tank disposed within a fuel tank, wherein the sub-tank and the fuel tank are configured to store fuel;

a fuel pump positioned within the sub-tank and configured to pump fuel from the sub-tank;

a pumping apparatus configured to pump fuel from the fuel tank into the sub-tank;

a functional component disposed within the fuel tank and configured to generate heat while it is operated, wherein the heat generates vapor in the fuel; and a partition wall positioned within the sub-tank, wherein the partition wall divides an interior of the sub-tank into a first chamber and a second chamber, wherein the fuel pump is positioned in the first chamber of the sub-tank, and wherein fuel is configured to pass through the functional component and into the second chamber or through the second chamber.

2. The fuel supply device of claim 1, wherein the functional component is arranged so as to contact fuel in the sub-tank.

3. The fuel supply device of claim 1, wherein the pumping apparatus is disposed in the second chamber, and wherein the fuel passing through the functional component is supplied to the pumping apparatus.

4. The fuel supply device of claim 1, wherein the functional component is disposed in the second chamber.

5. The fuel supply device of claim 1, wherein the functional component is vertically positioned above the partition wall.

6. The fuel supply device of claim 5, wherein the partition wall includes a first portion positioned below the functional component and a second portion laterally adjacent the functional component, where the second portion has a height measured vertically from a bottom of the sub-tank that is higher than a height of the first portion measured vertically from a bottom of the sub-tank.

7. The fuel supply device of claim 5, wherein the functional component is positioned above the second chamber.

8. The fuel supply device of claim 7, wherein a lowest height of the second portion as measured vertically from a bottom of the sub-tank is greater than a lowest height of the functional component as measured vertically from the bottom of the sub-tank.

9. The fuel supply device of claim 5, wherein the functional component is arranged over the first and second chambers.

10. The fuel supply device of claim 7, wherein the functional component is arranged at a side of the partition wall.

11. The fuel supply device of claim 1, wherein the functional component is provided along a return passage configured to return a portion of fuel discharged from the fuel pump to the sub-tank.

12. The fuel supply device of claim 11, wherein the functional component is a reduction valve including a solenoid configured to open or close the return passage.

13. A fuel supply device comprising:

a fuel tank having a circular opening at an upper end;

a sub-tank fitted through the opening inside of the fuel tank, wherein the sub-tank and the fuel tank are configured to store fuel;

a fuel pump positioned within the sub-tank and configured to pump fuel from the sub-tank;

a pumping apparatus configured to pump fuel from the fuel tank into the sub-tank;

a functional component disposed within the fuel tank and configured to generate heat while it is operated, wherein the heat generates vapor in the fuel; and a partition wall disposed in the sub-tank and configured to partition an interior of the sub-tank into a first chamber and a second chamber, wherein the fuel pump is positioned in the first chamber, and wherein fuel is configured to pass through the functional component and into the second chamber or through the second chamber.

14. A fuel supply device comprising:

a fuel tank comprising a circular opening at an upper end;

a sub-tank fitted through the opening inside of the fuel tank, wherein the sub-tank includes a container configured to store fuel and a cover member coupled to the container with a vertical support column, wherein a biasing element coupled to the support column is configured to bias the cover member and the container vertically apart from each other, and wherein the cover member is configured to be secured to the upper end of the fuel tank to close the opening of the fuel tank, wherein the biasing element is configured to bias a bottom of the sub-tank into engagement with a bottom of the fuel tank with the cover member secured to the upper end of the fuel tank;

a fuel pump positioned within the sub-tank and configured to pump fuel from the sub-tank;

a pumping apparatus configured to pump fuel from within the fuel tank into the sub-tank;

a functional component disposed within the fuel tank and configured to generate heat while it is operated, wherein the heat generates vapor in the fuel; and a partition wall positioned in the sub-tank and configured to partition an interior of the sub-tank into a first chamber and a second chamber, wherein the fuel pump is disposed in the first chamber, and wherein fuel is configured to pass through the functional component and into the second chamber or through the second chamber.

15. The fuel supply device of claim 14, wherein the fuel pump has an output line comprising a check valve and a relief valve downstream of the check valve, where the relief valve includes a discharge port.

16. The fuel supply device of claim 15, wherein the check valve is configured to allow fuel to flow from the fuel pump at or above a threshold pressure and prevent fuel from flowing from the fuel pump below the threshold pressure.

17. The fuel supply device of claim 14, wherein the functional component is a reduction valve including a solenoid configured to open or close a return passage.

18. The fuel supply device of claim 17, wherein the reduction valve extends to a height that is greater than the first chamber and the second chamber of the fuel tank, wherein the reduction valve is disposed along a return passage configured to return a portion of fuel discharged from the fuel pump back to the sub-tank, wherein the reduction valve includes a discharge port oriented downwardly toward the second chamber, where fuel passing through the reduction valve is discharged into the second chamber of the sub-tank.

19. The fuel supply device of claim 17, wherein the partition wall includes a first portion positioned vertically below the functional component and a second portion extending vertically above a lower end of the functional component, wherein the reduction valve extends horizontally over the first portion of the partition wall from a space over the second chamber into a space over the first chamber, where the reduction valve does not extend over the second portion of the partition wall.

* * * * *